(12) United States Patent
Kwon et al.

(10) Patent No.: US 10,040,706 B2
(45) Date of Patent: Aug. 7, 2018

(54) CDI TYPE WATER TREATMENT APPARATUS

(71) Applicant: COWAY CO., LTD., Chungcheongnam-do (KR)

(72) Inventors: Tae Seong Kwon, Seoul (KR); In Du Choi, Seoul (KR); Soo Young Lee, Seoul (KR); Young Gun Cho, Seoul (KR); Sung Min Mun, Seoul (KR); Hyoung Min Moon, Seoul (KR); Byung Kil Park, Seoul (KR)

(73) Assignee: Coway Co., Ltd., Chungcheongnam-do (KR)

( * ) Notice: Subject to any disclaimer, the term of this patent is extended or adjusted under 35 U.S.C. 154(b) by 241 days.

(21) Appl. No.: 14/907,759

(22) PCT Filed: Jul. 4, 2014

(86) PCT No.: PCT/KR2014/006012
§ 371 (c)(1),
(2) Date: Jan. 26, 2016

(87) PCT Pub. No.: WO2015/020315
PCT Pub. Date: Feb. 12, 2015

(65) Prior Publication Data
US 2016/0176729 A1 Jun. 23, 2016

(30) Foreign Application Priority Data
Aug. 5, 2013 (KR) .................. 10-2013-0092393

(51) Int. Cl.
*C02F 1/469* (2006.01)
*C02F 1/00* (2006.01)
*C02F 1/28* (2006.01)

(52) U.S. Cl.
CPC ............ *C02F 1/4691* (2013.01); *C02F 1/008* (2013.01); *C02F 1/283* (2013.01);
(Continued)

(58) Field of Classification Search
CPC ....................................... C02F 1/4691
See application file for complete search history.

(56) References Cited

U.S. PATENT DOCUMENTS

| 5,620,597 | A | 4/1997 | Abdelman |
| 2010/0044244 | A1 | 2/2010 | Lee et al. |
| 2013/0277222 | A1 | 10/2013 | Kwon et al. |

FOREIGN PATENT DOCUMENTS

| CN | 101654295 A | 2/2010 |
| JP | H06-210112 A | 8/1994 |

(Continued)

OTHER PUBLICATIONS

European Search Report dated Jun. 6, 2016 for Corresponding European Application No. 14834388.2.
(Continued)

*Primary Examiner* — Brian W Cohen
(74) *Attorney, Agent, or Firm* — Renner, Otto, Boisselle & Sklar, LLP

(57) ABSTRACT

A CDI type water treatment apparatus according to the present invention includes: a CDI filter unit which discharges purified water in a purification mode for purifying raw water, discharges recycle water in a recycle mode for recycling electrodes, and includes a water inlet port through which the raw water is introduced and a water outlet port through which the purified water or the recycle water is discharged; a supply unit for supplying the raw water to the CDI filter unit; a dispensing unit for dispensing the purified water to a user; a discharge unit for discharging the recycle water to the outside; a valve unit including a plurality of
(Continued)

valves; and a control unit for controlling opening or closing the valves of the valve unit.

9 Claims, 12 Drawing Sheets

(52) U.S. Cl.
CPC .... *C02F 2201/005* (2013.01); *C02F 2201/46* (2013.01); *C02F 2201/46145* (2013.01); *C02F 2303/14* (2013.01); *C02F 2303/16* (2013.01); *C02F 2303/20* (2013.01); *C02F 2303/22* (2013.01)

(56) References Cited

FOREIGN PATENT DOCUMENTS

| | | |
|---|---|---|
| JP | 2013-017927 A | 1/2013 |
| KR | 10-2008-0107204 A | 12/2008 |
| KR | 10-2010-0033109 A | 3/2010 |
| KR | 10-2011-0128773 A | 11/2011 |
| KR | 2012-0078611 A | 7/2012 |
| WO | 2012/091500 | 7/2012 |
| WO | 2012/161534 | 11/2012 |
| WO | 2013/063578 | 5/2013 |

OTHER PUBLICATIONS

International Search Report for Corresponding International Application No. PCT/KR2014/006012, dated Oct. 22, 2014 and English translation thereof.

CDI TYPE WATER TREATMENT APPARATUS

This application is a national phase of International Application No. PCT/KR2014/006012 filed Jul. 4, 2014 and published in the Korean language.

TECHNICAL FIELD

The present invention relates to a CDI type water treatment apparatus, and more particularly, to a CDI type water treatment apparatus capable of preventing the performance of a filter from deteriorating due to fouling by removing the fouling generated on electrodes.

BACKGROUND ART

Water treatment apparatuses for treating raw water to generate purified water like water purifiers are being variously disclosed. Recently, water treatment apparatuses using electrical deionization, such as electro deionization (EDI), continuous electro deionization (CEDI) or capacitive deionization (CDI), have attracted attention. Among these, the CDI type water treatment apparatus has attracted the most attention.

The CDI method means a method for removing ions (contaminants) by using a principle that ions are adsorbed and desorbed on the surfaces of electrodes by an electrical force. This will be described in more detail with reference to FIGS. 12 and 13. When brine water (or raw water) including ions with a voltage applied to electrodes is made to pass between electrodes, negative ions move to a positive electrode, and positive ions move to a negative electrode as illustrated in FIG. 12. That is, adsorption occurs. Ions contained in the brine water may be removed by such adsorption. However, when the adsorption continues, the electrodes will no longer be able to adsorb ions. In this case, it is necessary to recycle the electrodes by desorbing ions adsorbed to the electrode, as illustrated in FIG. 13. (At this time, recycle water is generated and discharged.

Calcium ions and magnesium ions contained in the brine water are deposited on the electrode to generate scale. Such scale is referred to as inorganic fouling. Also, the fouling may be formed by general bacteria or organics, and this fouling is referred to as organic fouling. However, when the fouling is formed as such, a filter hardly exhibits the performance thereof properly. Thus, the CDI type water treatment apparatuses need to adopt a method for removing the scale formed on electrodes.

DISCLOSURE OF THE INVENTION

Technical Problem

In order to address the foregoing limitations, the present invention aims at providing a CDI type water treatment apparatus capable of preventing the performance of a filter from deteriorating due to fouling by removing the fouling generated on electrodes.

Technical Solution

According to an aspect of the present invention, there is provided a CDI type water treatment apparatus including: a CDI filter unit which discharges purified water in a purification mode for purifying raw water, discharges recycle water in a recycle mode for recycling electrodes, and includes a water inlet port through which the raw water is introduced and a water outlet port through which the purified water or the recycle water is discharged; a supply unit for supplying the raw water to the CDI filter unit; a dispensing unit for dispensing the purified water to a user; a discharge unit for discharging the recycle water to the outside; a valve unit including a supply valve disposed on a flow path from the supply unit to the water inlet port, a discharge valve disposed on a flow path from the water outlet port to the discharge unit, a dispensing valve disposed on a flow path from the water outlet port to the dispensing unit, a cleaning valve disposed on a flow path from an upstream side of the supply valve to the water outlet port, and a drain valve disposed on a flow path from a downstream side of the supply valve to the outside; and a control unit for controlling opening or closing the valves of the valve unit.

According to another aspect of the present invention, there is provided a CDI type water treatment apparatus including: a CDI filter unit which discharges purified water in a purification mode for purifying raw water, discharges recycle water in a recycle mode for recycling electrodes, and includes a water inlet port through which the raw water is introduced and a water outlet port through which the purified water or recycle water is discharged; a supply unit for supplying the raw water to the CDI filter unit; a dispensing unit for dispensing the purified water to a user; a discharge unit for discharging the recycle water to the outside; a valve unit including a supply valve disposed on a flow path from the supply unit to the water inlet port, a selection valve for selecting any one of a flow path from the water outlet port to the discharge unit, a flow path from the water outlet port to the dispensing unit, and a flow path from an upstream side of the supply valve to the water outlet port, and a drain valve disposed on a flow path from a downstream side of the supply valve to the outside; and a control unit for controlling opening or closing the valves of the valve unit.

Advantageous Effects

The CDI type water treatment apparatus according to the present invention may remove the fouling generated on electrodes by making raw water flow in the direction opposite to the flow direction of the raw water in a purification mode through controlling a valve unit, and thus there is an effect in that the performance of a filter may be prevented from deteriorating due to the generation of the fouling.

MODE FOR CARRYING OUT THE INVENTION

Preferred embodiments of the present invention will be described below in more detail with reference to the accompanying drawings. However, it is to be understood that the invention is not limited to the embodiments described below.

Embodiment 1

Figure 1:
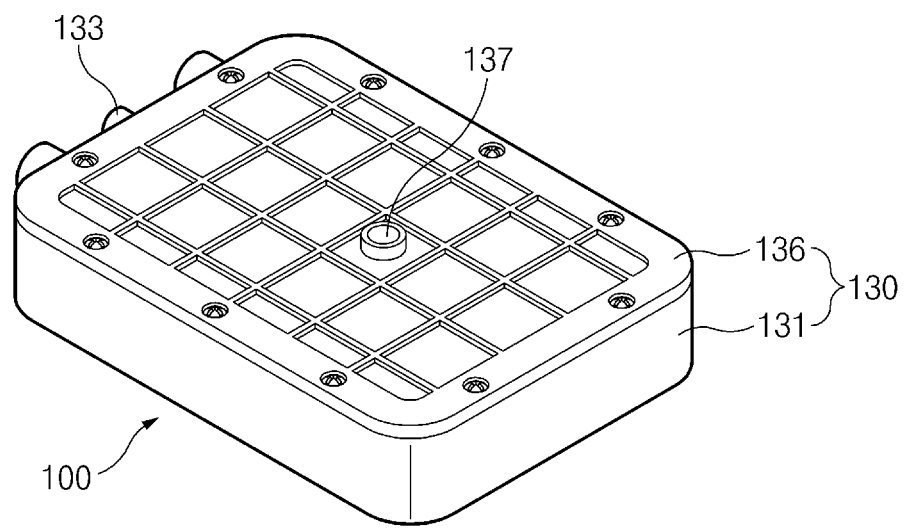
FIG. 1 is a perspective view illustrating a filter unit of a water treatment apparatus according to Embodiment 1 of the present invention.
Figure 2:
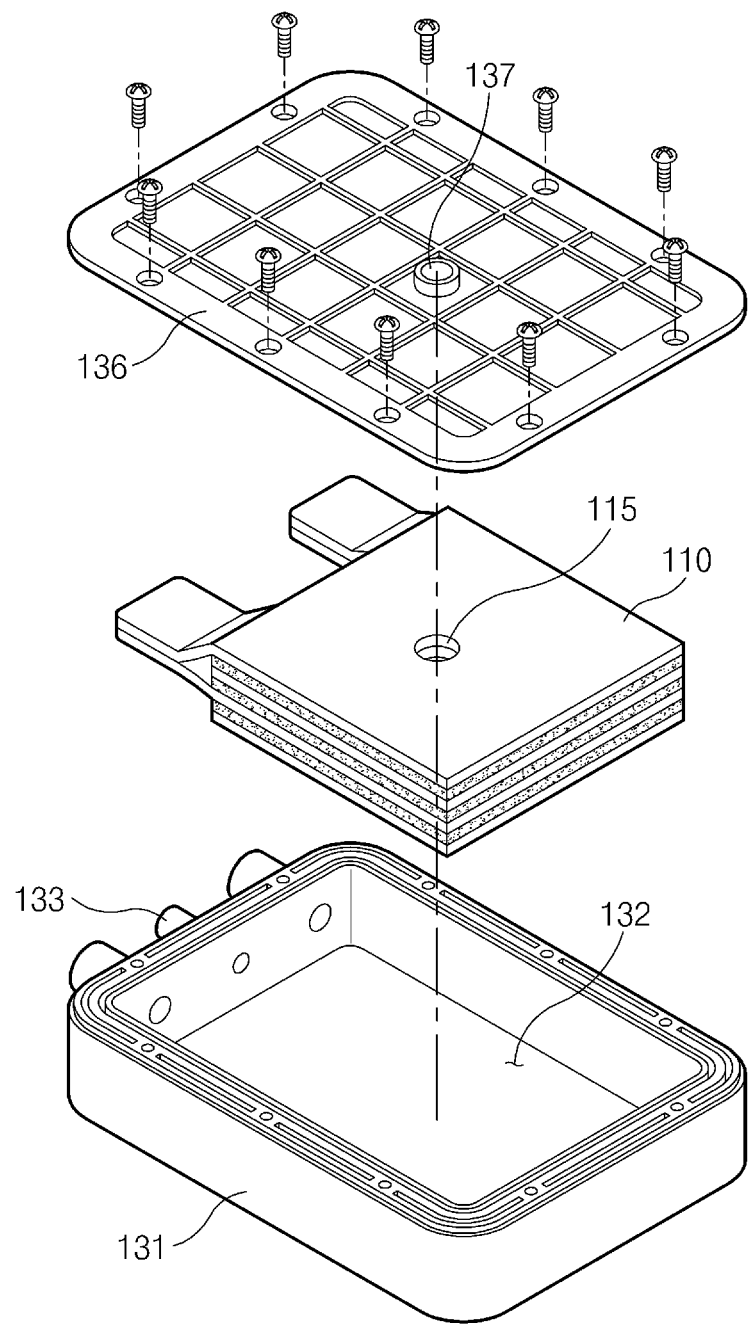
FIG. 2 is an exploded perspective view illustrating the filter unit of FIG. 1.

A water treatment apparatus according to Embodiment 1 of the present invention basically includes a filter unit 100 for purifying raw water and generating purified water. Here, the filter unit 100 may be a CDI filter of a CDI type which discharges purified water in a purification mode, and discharges recycle water in a recycle mode. More specifically, the filter unit 100 may include an electrode portion 110 and a case portion 130 as illustrated in FIGS. 1 and 2. For reference, FIG. 1 is a perspective view illustrating a filter unit of a water treatment apparatus according to Embodiment 1 of the present invention, and FIG. 2 is an exploded perspective view illustrating the filter unit of FIG. 1.

Figure 3:
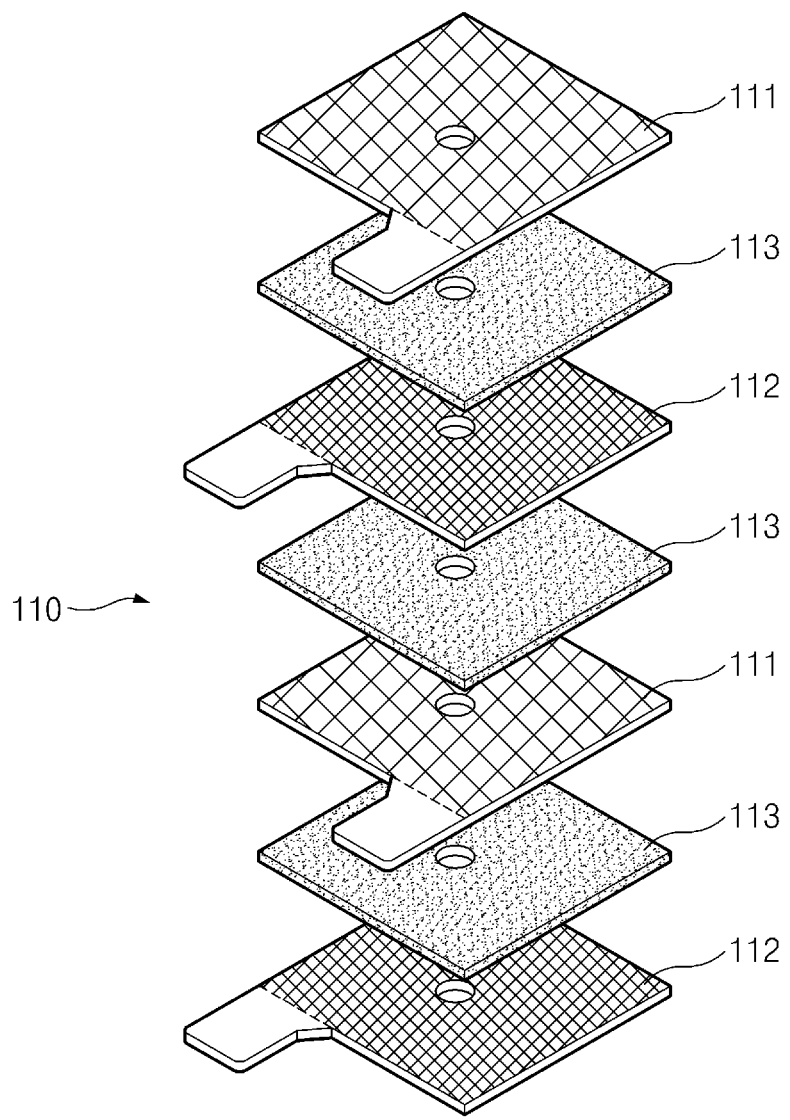
FIG. 3 is an exploded perspective view illustrating an electrode portion of the filter unit of FIG. 2.

The electrode portion 110 basically includes positive electrodes 111 and negative electrodes 112. More specifically, the electrode portion 110 is formed such that the positive electrodes 111 and the negative electrodes 112 are alternately laminated. FIG. 3 is an exploded perspective view illustrating the electrode portion of the filter unit in FIG. 2. Also, the electrode portion 110 includes separators (spacers) 113 between the positive electrodes 111 and the negative electrodes 112. The separators 113 may form gaps between the positive electrode plates 111 and the second electrode plates 112. Raw water flows along such gaps. For reference, the positive electrodes 111 and the negative electrodes 112 may formed by applying activated carbon on both surfaces of a graphite foil corresponding to a current collector.

This electrode portion 110 is accommodated in the case portion 130. The case portion 130 includes a lower case 131 which has an opening 132 formed on an upper portion thereof and accommodates the electrode portion 110 therein, and an upper case 136 sealing the opening 132 of the lower case 131. That is, the filter unit 100 according to this embodiment has a structure in which the electrode portion 110 is inserted into the lower case 131 through the opening 132 of the lower case 131, and then the opening 132 of the lower case 131 is sealed by the upper case 136.

Here, the lower case 131 has a water inlet port 133, through which raw water is introduced, at a side portion thereof, and a water outlet port 137, through which purified water is discharged, at an upper portion thereof. Accordingly, the raw water is supplied into the case portion 130 through the water inlet port 133, is then purified through the electrode portion 110, and is then discharged to the outside of the case portion 130 through the water outlet port 137.

Figure 4:
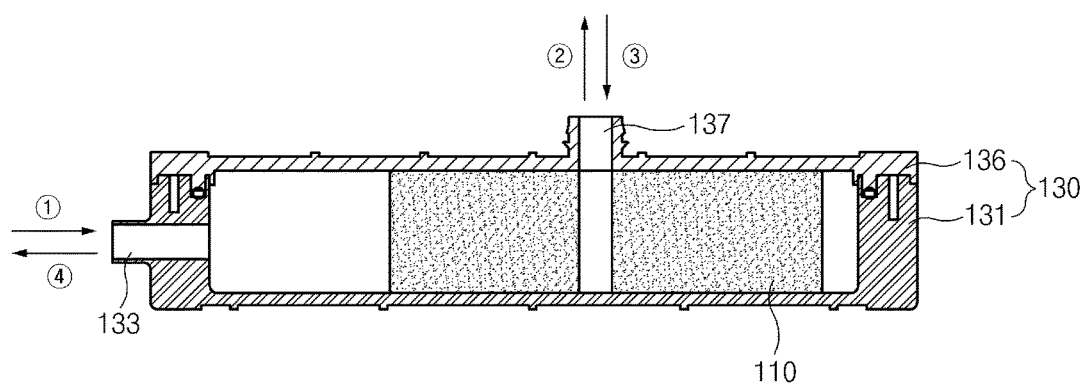
FIG. 4 is a cross-sectional view illustrating a cross-section of the filter unit of FIG. 1.

When fouling is generated on the electrodes 111 and 112, the performance of the filter unit 100 cannot but deteriorate. Accordingly, it is desirable to periodically remove the fouling. For this, the water treatment apparatus according to this embodiment controls the removal of the fouling through the control unit (not shown). More specifically, the control unit removes the fouling generated on the electrodes 111 and 112 by making the raw water flow in the direction opposite to the flow direction of the raw water in the purification mode. That is, when the raw water flows in the directions ① and ② of FIG. 4 in the purification mode, the raw water flows in the directions ③ and ④ of FIG. 4 in a cleaning mode (a mode in which the electrodes of a CDI filter unit are cleaned to remove the fouling). FIG. 4 is a cross-sectional view illustrating a cross-section of the filter unit of FIG. 1.

The reason for making the raw water flow in the opposite direction as the above is as follows. When the direction in which the raw water flows when the purified water is generated and the direction in which the raw water flows when the fouling is removed are the same as each other, there is a concern that the purified water containing the fouling may be supplied to a user. Also, since the fouling is typically (in comparison with the water outlet side) generated more in the water inlet side, it is advantageous on removing the fouling that the raw water flow in the opposite direction.

Figure 5:
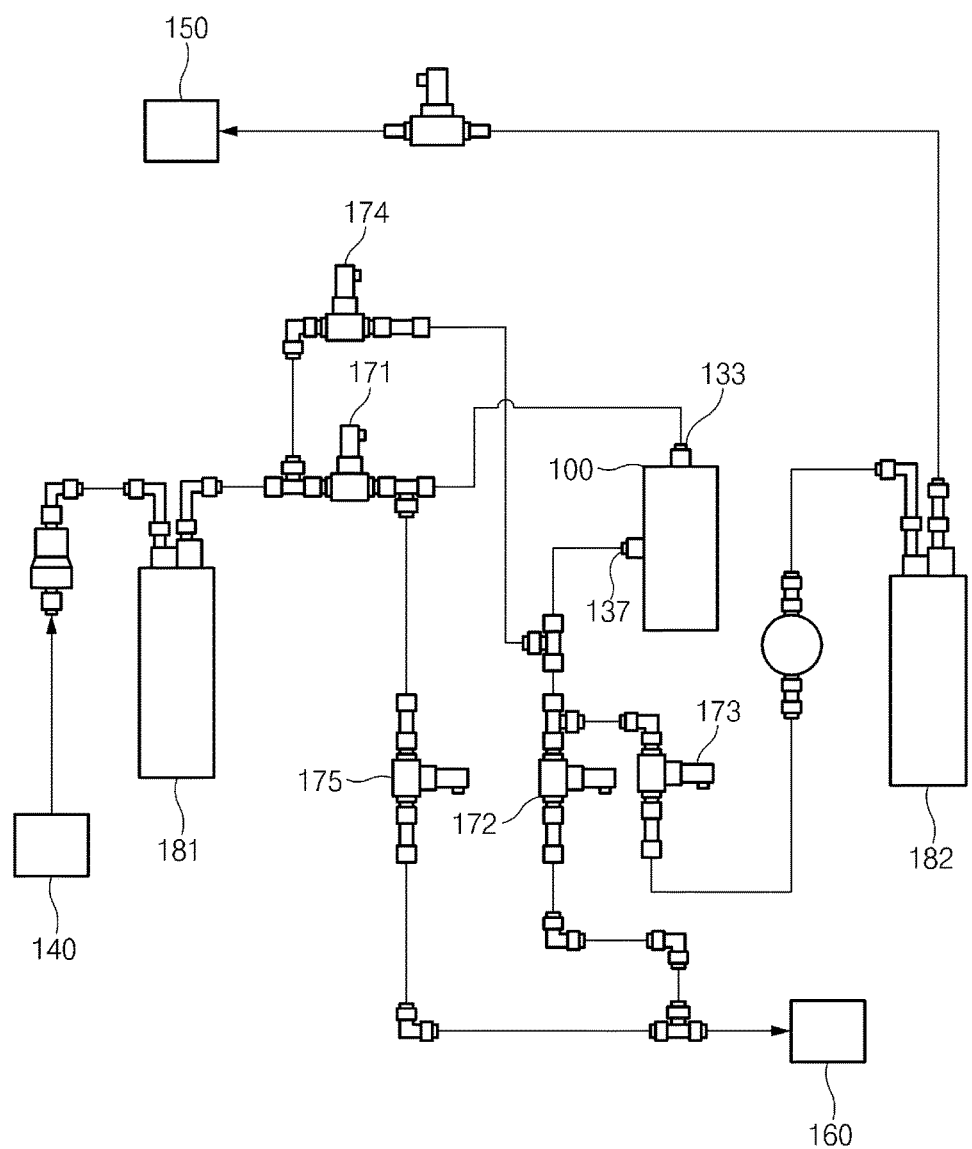
FIG. 5 is a schematic view schematically illustrating a water treatment apparatus, in which the filter of FIG. 1 is used, according to Embodiment 1 of the present invention.

To perform the control as the above, the water treatment apparatus according to this embodiment is provided with a structure illustrated in FIG. 5. FIG. 5 is a schematic view schematically illustrating a water treatment apparatus, in which the filter unit of FIG. 1 is employed, according to Embodiment 1 of the present invention. As illustrated in FIG. 5, the water treatment apparatus according to this embodiment includes: a supply unit 140 for supplying raw water to the filter unit 100; a dispensing unit 150 for dispensing the purified water generated from the filter unit 100 to a user; and a discharge unit 160 for discharging the recycle water generated from the filter unit 100 to the outside.

Here, the supply unit 140 may be variously implemented. For example, the supply unit 140 may be a kind of conduits for receiving raw water from the outside. Also, the dispensing unit 150 may also be variously implemented, and may be, for example, a kind of cocks for supplying purified water to a user. Also, the discharging unit 160 may also be variously implemented, and may be, for example, a kind of conduits for discharging recycle water to the outside.

The water treatment apparatus according to this embodiment also includes a valve unit. As illustrated in FIG. 5, the valve unit is provided with: a supply valve 171 disposed on the flow path from the supply unit 140 to the water inlet port 133; a discharge valve 172 disposed on the flow path from the water outlet port 137 to the discharge unit 160; a dispensing valve 173 disposed on the flow path from the water outlet port 137 to the dispensing unit 150; a cleaning valve 174 disposed on the flow path from an upstream side of the supply valve 171 to the water outlet port 137; and a drain valve 175 disposed on the flow path from a downstream side of the supply valve 171 to the outside. (For reference, the upstream side of the supply valve means the left side of the supply valve with respect to FIG. 5, and the downstream side of the supply valve means the right side of the supply valve with respect to FIG. 5.) These valves may be implemented as solenoid valves for an electronic control.

Hereinafter, the control performed by the control unit to remove the fouling in the above-mentioned structure will be described in more detail. When the electrodes 111 and 112 of the filter unit need to be cleaned to remove fouling, the control unit performs a control for closing the supply valve 171, closing the discharge valve 172, closing the dispensing valve, opening the cleaning valve 174, and opening the drain valve 175. When this control is performed, raw water may be introduced through the water outlet port 137 due to the pressure by which the raw water is supplied from the outside (or due to the pressure generated inside by the operation of a pump) and may be discharged through the water inlet port 133. Then, the raw water may be discharged through the drain valve 175. Here, the raw water may be directly discharged to the outside, and also be discharged through the discharge unit 160, as illustrated in FIG. 5.

Of course, the control unit may also perform a control according to the purification mode or the recycle mode. For example, in the purification mode, the control unit performs a control for opening the supply valve 171, closing the discharge valve 172, opening the dispensing valve 173, closing the cleaning valve 174, and closing the drain valve 175. This control makes the raw water flow from the supply unit 140 to the dispensing unit 150 via the filter unit 100. Also, in the recycle mode, the control unit performs a control for opening the supply valve 171, opening the discharge valve 172, closing the dispensing valve 173, closing the cleaning valve 174, and closing the drain valve 175. This control makes the raw water flow from the supply unit 140 to the discharge unit 160 via the filter unit 100.

Figure 6:
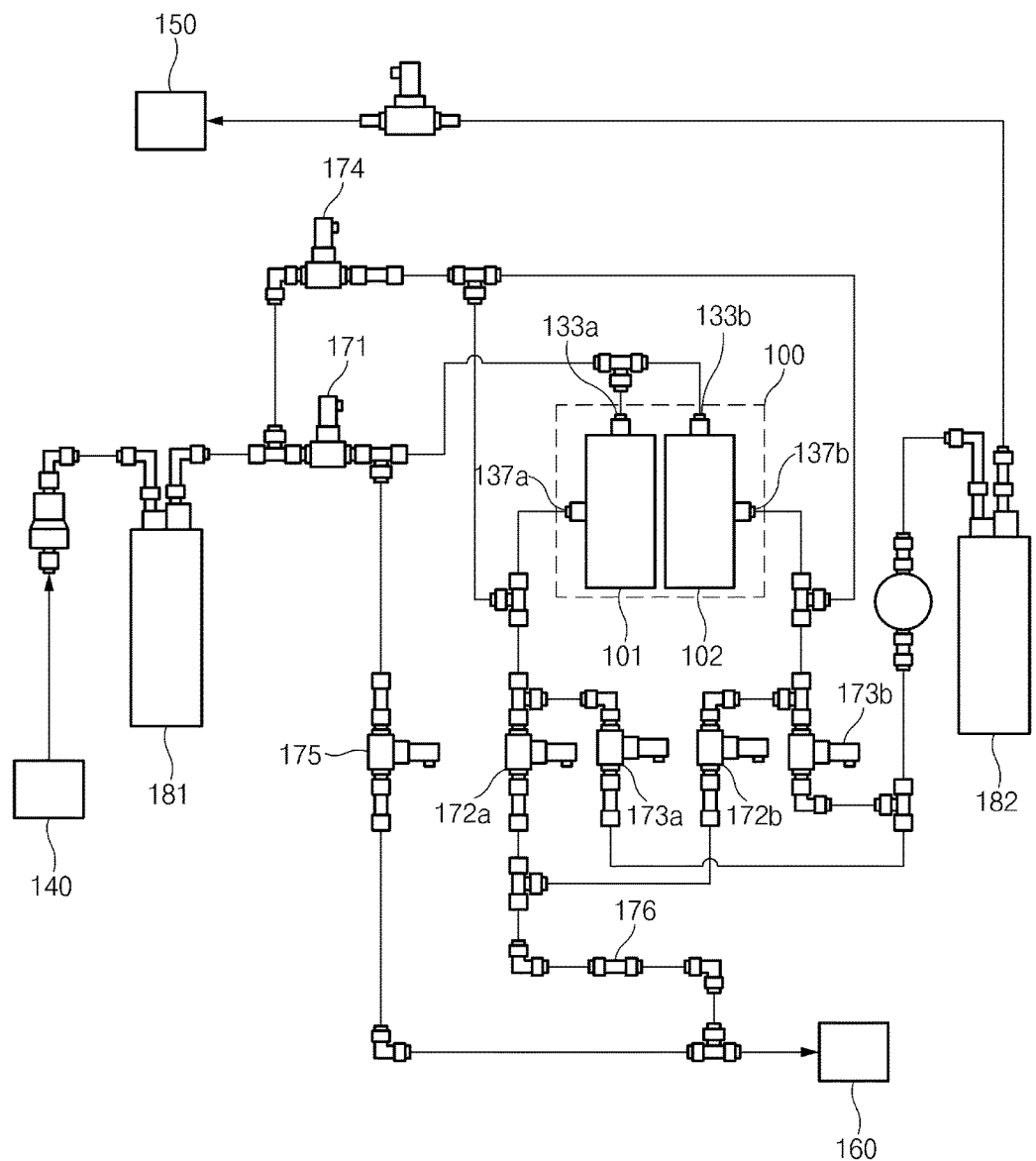
FIG. 6 is a schematic view schematically illustrating a modified example of the water treatment apparatus of FIG. 5.

Also, the filter unit 100 may include two CDI filters 101 and 102 as illustrated in FIG. 6. FIG. 6 is a schematic view schematically illustrating a modified example of the water treatment apparatus of FIG. 5. The CDI filters need to recycle the electrodes. However, if the number of the CDI filters is one, purified water may not be generated during recycling of the electrodes. Accordingly, in order to continuously generate purified water regardless of the recycling of the electrodes, the filter unit 100 desirably includes two CDI filters 101 and 102. That is, when any one CDI filter is in the recycle mode, the other CDI filter is desirably in the purification mode. Alternatively, when any one CDI filter is neither in the recycle mode nor in the purification mode, that is, in a wait mode, the other CDI filter is desirably in the purification mode.

Even though the filter unit 100 includes two CDI filters 101 and 102 at the above, the control unit may likewise perform the above-mentioned control. That is, as illustrated in FIG. 6, after forming a flow path symmetrical to each of the CDI filters, the above-mentioned control may be likewise performed through the control unit. For example, when the CDI filter 101 is in the recycle mode and the CDI filter 102 is in the purification mode, it is sufficient to perform a control for opening the supply valve 171, opening a discharge valve 172a, closing a dispensing valve 173a, closing the discharge valve 172b, opening the dispensing valve 173b, closing the cleaning valve 174, and closing the drain valve 175.

Meanwhile, when the filter unit 100 includes the two CDI filters 101 and 102, a flow rate adjusting valve 176 may be disposed downstream from the discharge valve 172. The flow rate adjusting valve 176 may adjust the amount of the recycle water discharged to the outside and may thereby adjust the ratio of purified water to the recycle water. For example, when the first CDI filter 101 is in the purification mode, and the second CDI filter 102 is in the recycle mode, the first discharge valve 172a will be closed, the first dispensing valve 173a will be opened, the second discharge valve 172b will be opened, and the second dispensing valve 173b will be closed. Here, when the amount of the recycle water generated from the second CDI filter 102 and discharged to the outside is 2, and the amount of the raw water supplied from the supply unit 140 to the filter unit 100 is 10, the amount of the raw water supplied from the supply unit 140 to the first CDI filter unit 101 will be 8, and the amount of the raw water supplied from the supply unit 140 to the second CDI filter unit 102 will be 2. As such, when the amount of the recycle water discharged to the outside is adjusted through the flow rate adjusting valve 176, the ratio of purified water to the recycle water may be adjusted.

For reference, the water treatment apparatus according to Embodiment 1 of the present invention may further include another filter. For example, the water treatment apparatus according to Embodiment 1 of the present invention may further include a carbon pre-filter 181 for mainly removing chlorine substances and a carbon post-filter 182 mainly for deodorization.

Embodiment 2

Figure 7:
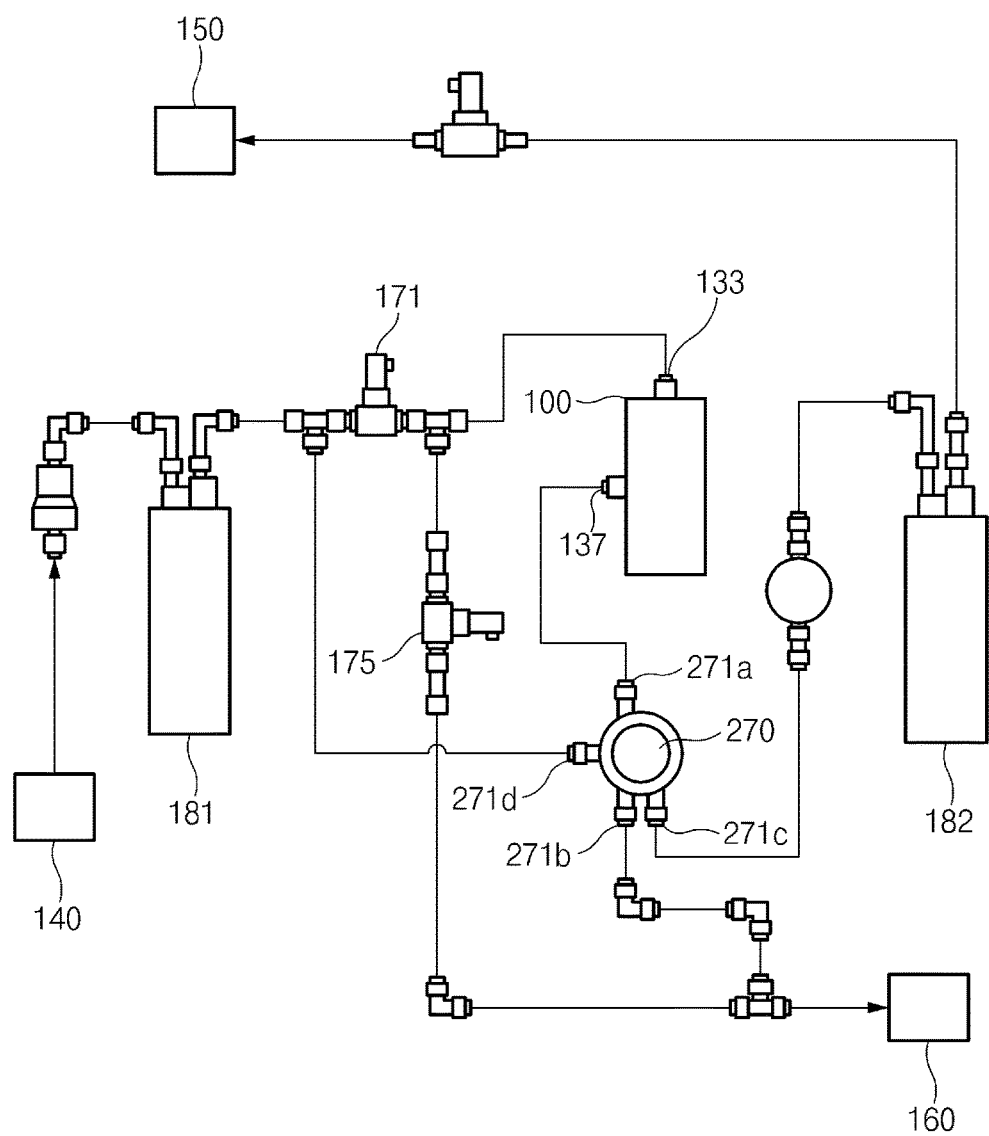
FIG. 7 is a schematic view schematically illustrating a water treatment apparatus according to Embodiment 2 of the present invention.

FIG. 7 is a schematic view schematically illustrating a water treatment apparatus according to Embodiment 2 of the present invention. For reference, components having the same as or equivalent to the above-mentioned components will be given the same or equivalent reference numerals, and detailed descriptions thereof will not be provided.

A water treatment apparatus according to this embodiment, like the water treatment apparatus according to the above-mentioned Embodiment 1, also includes a filter unit 100, a supply unit 140, a dispensing unit 150, a discharge unit 160, and a control unit. The only difference is in a valve unit. In this embodiment, the valve unit includes: a supply valve 171 disposed on the flow path from the supply unit 140 to a water inlet port 133; a selection valve 270 for selecting any one of the flow path from the water outlet port 137 to the discharge unit 160, the flow path from the water outlet port 137 to the dispensing unit 150, and the flow path from the upstream side of the supply valve 171 to the water outlet port 137; and a drain valve 175 disposed on the flow path from the downstream side of the supply valve 171 to the outside.

In the purification mode, the control unit performs a control for opening the supply valve 171, selecting the flow path from the water outlet port 137 to the dispensing unit 150 through the selection valve 270, and closing the drain valve 175. This control makes the raw water flow from the supply unit 140 to the dispensing unit 150 via the filter unit 100. Also, in the recycle mode for recycling electrodes, the control unit performs a control for opening the supply valve 171, selecting the flow path from the water outlet port 137 to the discharge unit 160 through the selection valve 270, and closing the drain valve 175. This control makes the raw water flow from the supply unit 140 to the discharge unit 160 via the filter unit 100.

Also, when it is required to remove fouling from the electrodes of the filter unit 100, the control unit performs a control for closing the supply valve 171, selecting the flow path from the upstream side of the supply valve 171 to the water outlet port 137 through the selection valve 270, and opening the drain valve 175. This control makes the raw water flow in the direction opposite to the flow direction of the raw water when purified water is generated, and thereby removes the fouling generated on the electrodes.

Figure 8:
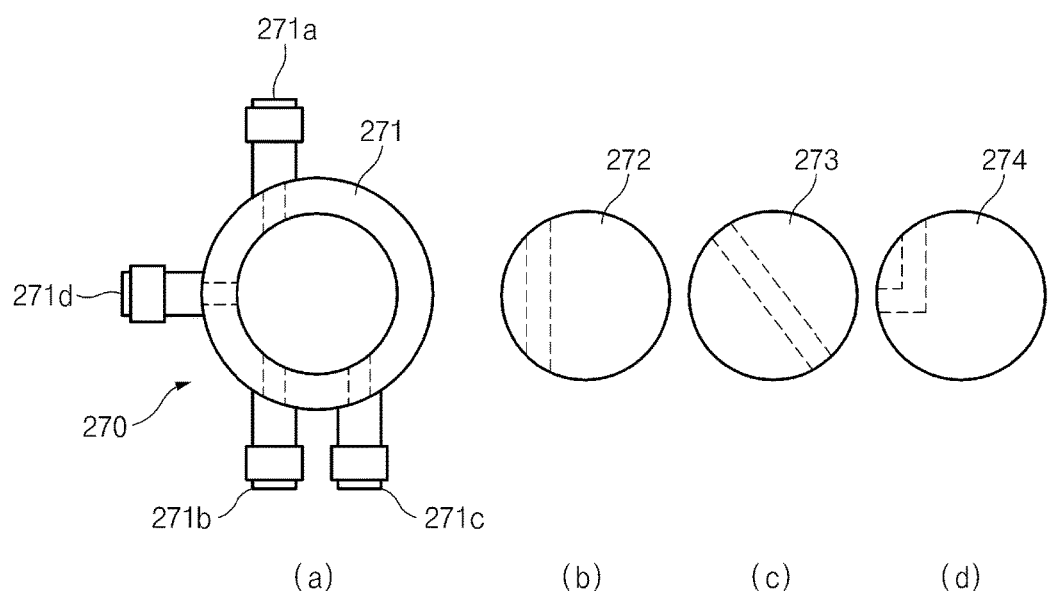
FIG. 8 is a plan view illustrating a selection valve of the water treatment apparatus of FIG. 7.

Meanwhile, the selection valve 270 includes a case 271, and three selection plates 272, 273, and 274 disposed inside the case 271. More specifically, as illustrated in FIGS. 7 and 8, the case 271 has a first inlet/outlet port 271a communicating with the water outlet port 137, a second inlet/outlet port 271b communicating with the discharge unit 160, a third inlet/outlet port 271c communicating with the dispensing unit 150, and a fourth inlet/outlet port 271d communicating with the upstream side of the supply valve 171. Also, as illustrated in FIG. 8, a flow path connecting the first inlet/outlet port 271a with the second inlet/outlet port 271b inside the case 271 is formed in the first selection plate 272, a flow path connecting the first inlet/outlet port 271a with the third inlet/outlet port 271c inside the case 271 is formed in the second selection plate 273, and a flow path connecting the first inlet/outlet port 271a with the fourth inlet/outlet port 271d inside the case 271 is formed in the third selection plate 274.

The selection valve 270 may select any one of the several flow paths through this structure. For example, when the first selection plate 272 is selected, since the first and second inlet/outlet ports 271a and 272b are connected with each other, the flow path from the water outlet port 137 to the discharge unit 160 may be selected. Likewise, when the second selection plate 273 is selected, since the first and third inlet/outlet ports 271a and 272c are connected with each other, the flow path from the water outlet port 137 to the dispensing unit 150 may be selected. This selection may be implemented thorough up and down movements of the selection plates. That is, after stacking three selection plates 272, 273, and 274 in the vertical direction, the required selection plate may be moved up and down to be connected to the desired inlet/outlet port. However, the selection valve 270 is not limited to this configuration.

Figure 9:
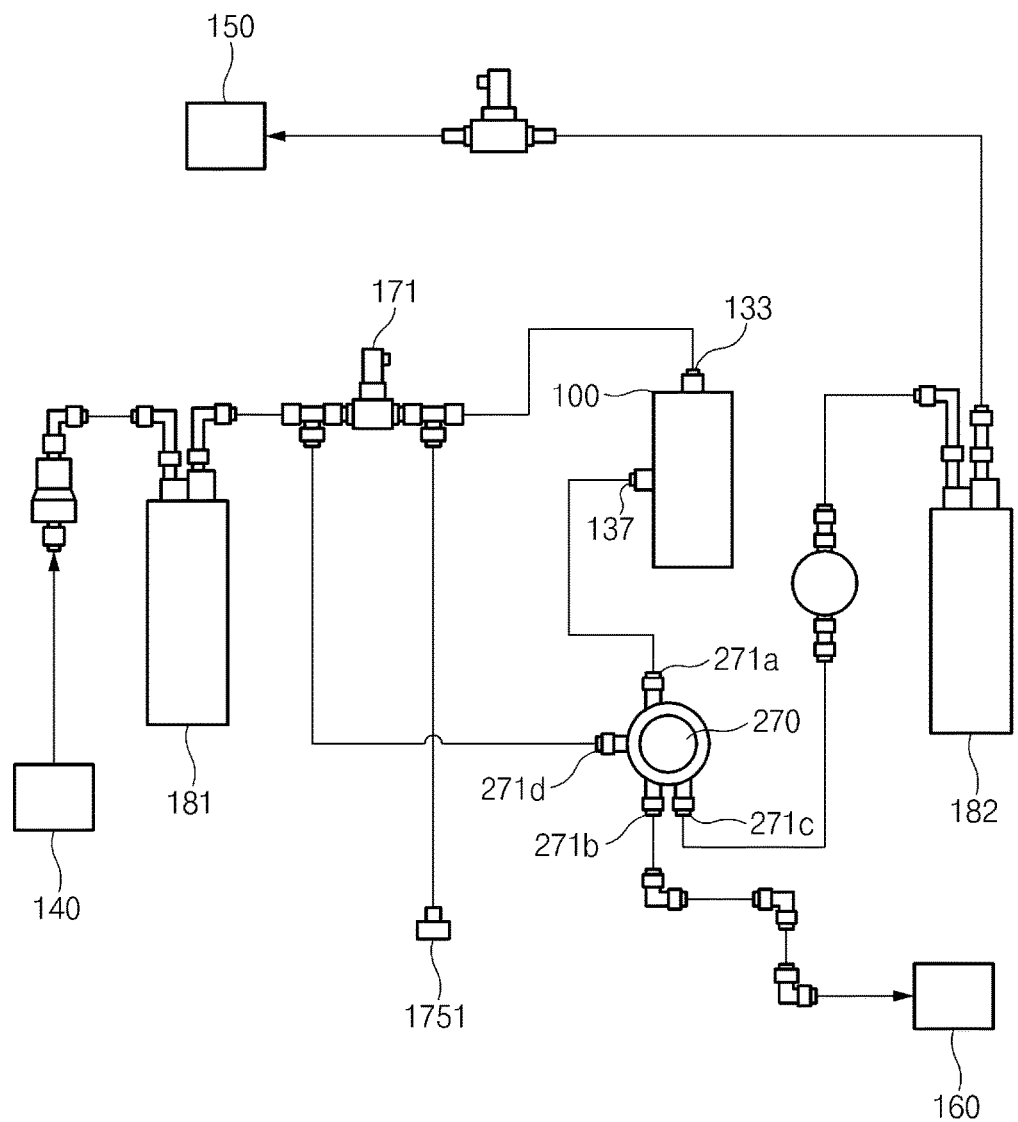
FIG. 9 is a schematic view schematically illustrating a first modified example of the water treatment apparatus of FIG. 7.

Meanwhile, the water treatment apparatus of FIG. 7 may be modified like FIG. 9. FIG. 9 is a schematic view schematically illustrating a first modified example of the water treatment apparatus of FIG. 7. As illustrated in FIG. 9, a water treatment apparatus according to this modified example is characterized by simplifying a drain valve 1751. That is, in this modified example, the drain valve 1751 may be a detachable valve which is opened when a separate tube is connected thereto from the outside. When implemented like this, the drain valve 1751 may be easily opened by connecting a separate tube to the drain valve 1751, if necessary.

Figure 10:
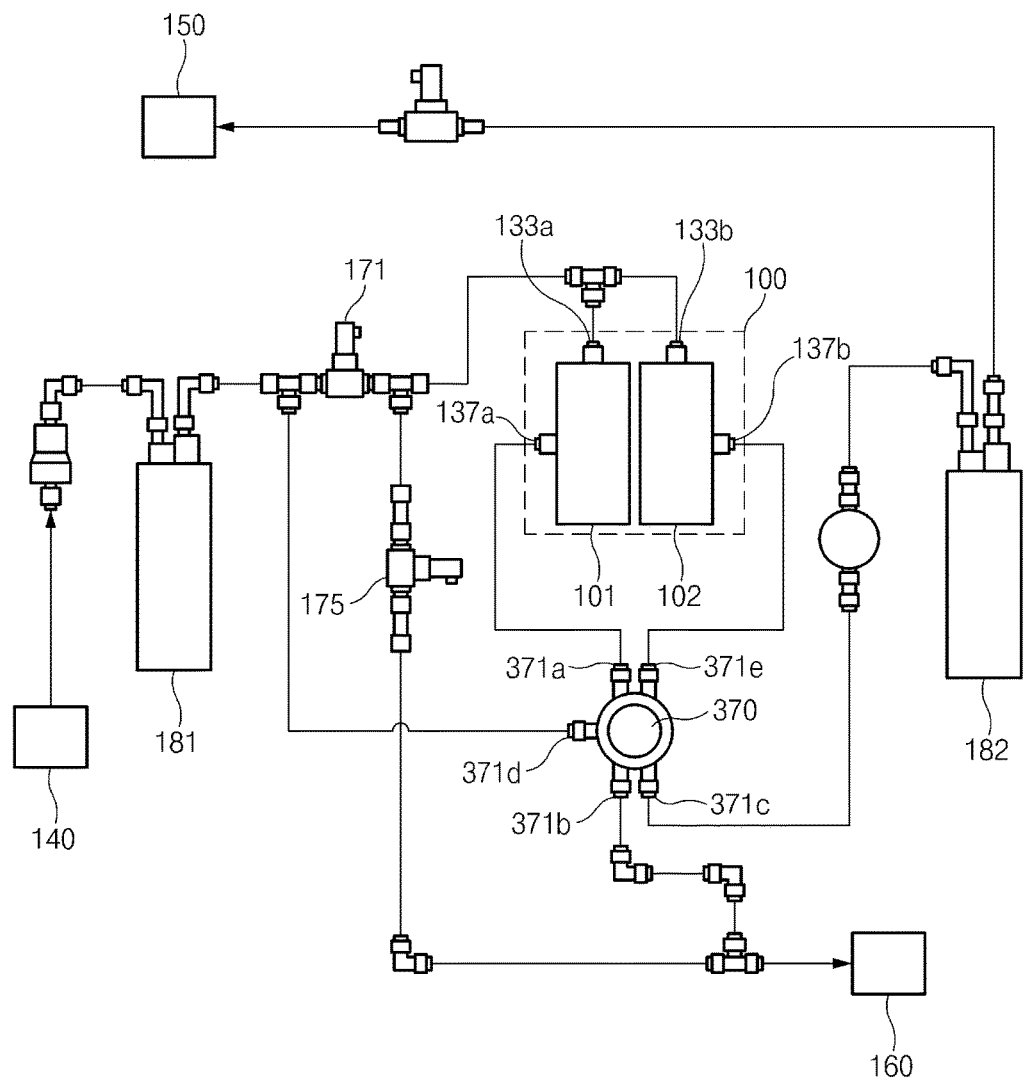
FIG. 10 is a schematic view schematically illustrating a second modified example of the water treatment apparatus of FIG. 7.

Also, the water treatment apparatus of FIG. 7 may be modified like FIG. 10. FIG. 10 is a schematic view schematically illustrating a second modified example of the water treatment apparatus of FIG. 7. As illustrated in FIG. 10, a filter unit 100 of this modified example includes two CDI filters 101 and 102. Here, the first CDI filter 101 includes a first water inlet port 133a through which raw water is introduced, and a first water outlet port 137a through which purified water or recycle water is discharged, and the second CDI filter 102 includes a second water inlet port 133b through which raw water is introduced, and a second water outlet port 137b through which purified water or recycle water is discharged. Through this, the supply unit 140, as illustrated in FIG. 10, communicates with both the first water inlet port 133a and the second water inlet port 133b.

Since the two CDI filters are provided like this, a selection valve 370 also has a difference in configuration. More specifically, as illustrated in FIGS. 10 and 11, a case 371 includes a first inlet/outlet port 371a communicating with the first water outlet port 137a, a second inlet/outlet port 371b communicating with a discharge unit 160, a third inlet/outlet port 371c communicating with a dispensing unit 150, a fourth inlet-outlet port 371d communicating with the upstream side of a supply valve 171, and a fifth inlet-outlet port 371e communicating with the second water outlet port 137b.

Figure 11:
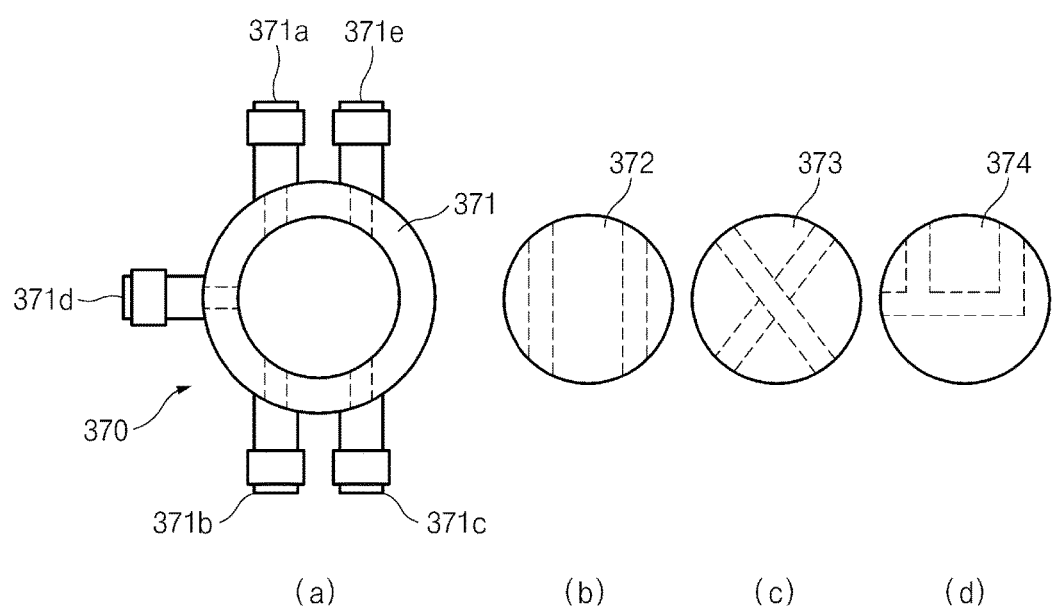
FIG. 11 is a plan view illustrating a selection valve of the water treatment apparatus of FIG. 10.
Figure 12:
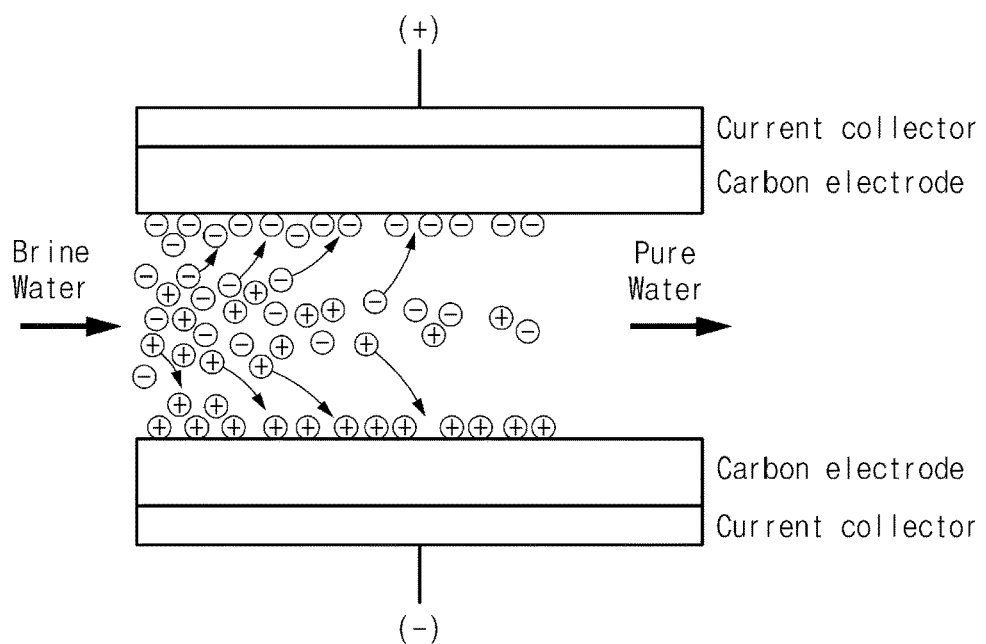
FIG. 12 is a conceptual diagram describing a principle of purifying water in a CDI method.
Figure 13:
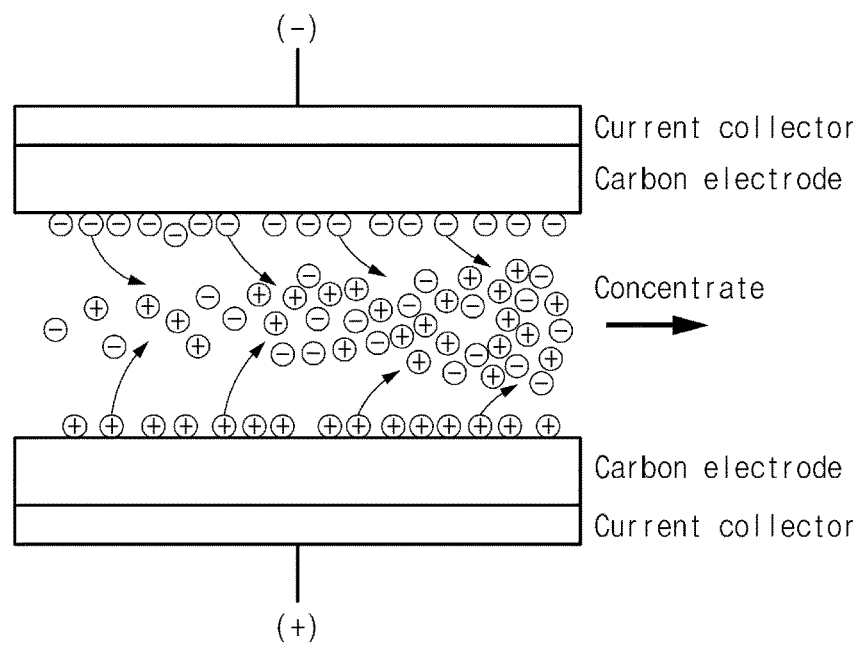
FIG. 13 is a conceptual diagram describing a principle of recycling in the CDI method.

Also, as illustrated in FIG. 11, in a first selection plate 372, a flow path connecting the first inlet/outlet port 371a and the second inlet/outlet port 371b inside the case 371 and a flow path connecting the fifth inlet/outlet port 371e and the third inlet/outlet port 371c are respectively formed inside the case 371. Also, in a second selection plate 373, a flow path connecting the first inlet/outlet port 371a and the third inlet/outlet port 371c and a flow path connecting the fifth inlet/outlet port 371e and the second inlet/outlet port 371b are respectively formed inside the case 371. Finally, in a third selection plate 374, a flow path connecting the first inlet/outlet port 371a and the fourth inlet/outlet port 371d, and connecting the fifth inlet/outlet port 371e and the fourth inlet/outlet port 371d is formed inside the case 371.

This selection valve 370 may be operated as follows. When the first CDI filter 101 is in the purification mode, and the second CDI filter 102 is in the recycle mode, the second selection plate 373 may be selected. Due to this selection, the purified water generated from the first CDI filter 101 may be supplied to the dispensing unit 150, and the recycle water generated from the second CDI filter 102 may be supplied to the discharge unit 160. On the contrary, when the first CDI filter 101 is in the recycle mode, and the second CDI filter 102 is in the purification mode, the first selection plate 372 may be selected. Due to this selection, the recycle water generated from the first CDI filter 101 may be supplied to the discharge unit 160, and the purified water generated from the second CDI filter 102 may be supplied to the dispensing unit 150. Also, when the third selection plate 374 is selected because the electrodes need to be cleaned, raw water is introduced to each of the water outlet ports 137a and 137b of the CDI filter, then cleans the electrodes, and is then discharged through the water inlet ports 133a and 133b, respectively.

Meanwhile, the selection valve 370 may replace the flow rate adjusting valve described in the above-mentioned embodiment. More specifically, when the second and third inlet/outlet ports 371b and 371c have sizes different from each other, the amount of recycle water supplied to the discharge unit 160 through the second inlet/outlet port 372b and the amount of purified water supplied to the dispensing unit 150 through the third inlet/outlet port 371c may be different from each other. When the second and third inlet/outlet ports 371b and 371c are formed in sizes different from each other corresponding to a required ratio, the ratio of the purified water to the recycle water may be adjusted on the basis of this principle.

The invention claimed is:

1. A CDI type water treatment apparatus comprising:
   a CDI filter unit which discharges purified water in a purification mode for purifying raw water, discharges recycle water in a recycle mode for recycling electrodes, and includes a water inlet port through which the raw water is introduced and a water outlet port through which the purified water or recycle water is discharged;
   a supply unit for supplying the raw water to the CDI filter unit;
   a dispensing unit for dispensing the purified water to a user;
   a discharge unit for discharging the recycle water to the outside;
   a valve unit including a supply valve disposed on a flow path from the supply unit to the water inlet port, a selection valve for selecting any one of a flow path from the water outlet port to the discharge unit, a flow path from the water outlet port to the dispensing unit, and a flow path from an upstream side of the supply valve to the water outlet port, and a drain valve disposed on a flow path from a downstream side of the supply valve to the outside; and a control unit for controlling opening or closing the valves of the valve unit, wherein the selection valve comprises:

a case including a first inlet/outlet port communicating with the water outlet port, a second inlet/outlet port communicating with the discharge unit, a third inlet/outlet port communicating with the dispensing unit, and a fourth inlet/outlet port communicating with the upstream of the supply valve;

a first selection plate having a flow path connecting the first and second inlet/outlet ports inside the case;

a second selection plate having a flow path connecting the first and third inlet/outlet ports inside the case; and a third selection plate having a flow path connecting the first and fourth inlet/outlet ports inside the case.

2. The CDI type water treatment apparatus of claim 1, wherein the control unit performs, in the purification mode, a control for opening the supply valve, selecting the flow path from the water outlet port to the dispensing unit through the selection valve, and closing the drain valve.

3. The CDI type water treatment apparatus of claim 1, wherein the control unit performs, in the recycle mode, a control for opening the supply valve, selecting the flow path from the water outlet port to the discharge unit through the selection valve, and closing the drain valve.

4. The CDI type water treatment apparatus of claim 1, wherein the control unit performs, when the electrodes of the CDI filter unit need to be cleaned, a control for closing the supply valve, selecting the flow path from the upstream side of the supply valve to the water outlet port through the selection valve, and opening the drain valve.

5. The CDI type water treatment apparatus of claim 1, wherein the drain valve is a detachable valve being opened when a separate tube is connected from the outside.

6. The CDI type water treatment apparatus of claim 1, wherein the selection valve selects a required flow path by selecting any one of the selection plates.

7. A CDI type water treatment apparatus comprising:

a CDI filter unit which discharges purified water in a purification mode for purifying raw water, discharges recycle water in a recycle mode for recycling electrodes, and includes a water inlet port through which the raw water is introduced and a water outlet port through which the purified water or recycle water is discharged;

a supply unit for supplying the raw water to the CDI filter unit;

a dispensing unit for dispensing the purified water to a user;

a discharge unit for discharging the recycle water to the outside;

a valve unit including a supply valve disposed on a flow path from the supply unit to the water inlet port, a selection valve for selecting any one of a flow path from the water outlet port to the discharge unit, a flow path from the water outlet port to the dispensing unit, and a flow path from an upstream side of the supply valve to the water outlet port, and a drain valve disposed on a flow path from a downstream side of the supply valve to the outside; and a control unit for controlling opening or closing the valves of the valve unit, wherein the CDI filter unit comprises a first CDI filter and a second CDI filter performing the purification mode when the first CDI filter is not in the purification mode;

the first CD filter comprises a first water inlet port through which the raw water is introduced and a first water outlet port through which the purified water or the recycle water is discharged;

the second CDI filter comprises a second water inlet port through which the raw water is introduced and a second water outlet port through which the purified water or the recycle water is discharged; and the flow path from the supply unit to the water inlet port communicates with both the first water inlet port and the second water inlet port; and wherein the selection valve comprises:

a case including a first inlet/outlet port communicating with the first water outlet port, a second inlet/outlet port communicating with the discharge unit, a third inlet/outlet port communicating with the dispensing unit, a fourth inlet/outlet port communicating with the upstream of the supply valve, and a fifth inlet/outlet port communicating with the second water outlet port;

a first selection plate having, inside the case, a flow path connecting the first inlet/outlet port with the second inlet/outlet port and a flow path connecting the fifth inlet/outlet port with the third inlet/outlet port, respectively;

a second selection plate having, inside the case, a flow path connecting the first inlet/outlet port with the third inlet/outlet port and a flow path connecting the fifth inlet/outlet port with the second inlet/outlet port, respectively; and a third selection plate having, inside the case, a flow path connecting the first inlet/outlet port with the fourth inlet/outlet and connecting the fifth inlet/outlet port with the fourth inlet/outlet port.

8. The CDI type water treatment apparatus of claim 7, wherein the selection valve selects a required flow path by selecting any one of the selection plates.

9. The CDI type water treatment apparatus of claim 7, wherein the selection valve adjusts a ratio of the purified water to the recycle water by forming the second and third inlet/outlet ports to have sizes different from each other.

* * * * *